United States Patent

[11] 3,577,144

| [72] | Inventor | Pierre Girault<br>Paris, France |
|---|---|---|
| [21] | Appl. No. | 766,559 |
| [22] | Filed | Oct. 10, 1968 |
| [45] | Patented | May 4, 1971 |
| [73] | Assignee | CSF Campagnie General De Telegraphie Sans Fil |
| [32] | Priority | Oct. 31, 1967 |
| [33] |  | France |
| [31] |  | 126.610 |

[54] DISTANCE MEASURING SYSTEMS
4 Claims, 3 Drawing Figs.

| [52] | U.S. Cl. | 343/14, 343/7, 343/12, 356/5 |
|---|---|---|
| [51] | Int. Cl. | G01s 9/23 |
| [50] | Field of Search | 343/12, 14, 7 (RS); 356/5 |

[56] References Cited
UNITED STATES PATENTS

| 2,594,263 | 4/1952 | Munster | 343/7X |
|---|---|---|---|
| 2,929,057 | 3/1960 | Green | 343/14 |
| 3,216,010 | 11/1965 | Roeschke | 343/7X |
| 3,360,797 | 12/1967 | Plcou | 343/14 |

*Primary Examiner*—Rodney D. Bennett, Jr.
*Assistant Examiner*—Joseph G. Baxter
*Attorney*—Cushman, Darby and Cushman

ABSTRACT: A distance measuring system comprising means for transmitting a sinusoidal wave or a sinusoidally modulated wave and receiving the same after reflection on a target and means for converting the phase shift, due to the propagation of this wave out and back, into a measuring signal the frequency of which is proportional to the travelling distance of said wave.

DISTANCE MEASURING SYSTEMS

The present invention relates to distance measuring systems, using acoustic or electromagnetic waves, which are used to measure the distance from such a system to a reflecting target.

In one known technique, a time interval meter, which is controlled at transmission and reception ends by electrical pulses, produces at regular intervals a distance indication which corresponds to the time taken by the pulse modulated wave to propagate out and back through the range separating the target from the distance measuring system. The drawback of this technique is that it provides intermittent indications; by increasing the frequency of measurement, this drawback can be reduced but the relationship between the transmitted signals and the corresponding echoes becomes progressively more difficult to determine.

Another technique consists in transmitting a sinusoidal wave or a wave sinusoidally modulated, and measuring the phase shift experienced by the wave in travelling the distance out to the target and back to the distance measuring system. In this case, the problem arises of making a signal having an easily measurable characteristic, proportional to the instantaneous value of the said phase shift.

It is an object of this invention to provide a particularly satisfactory solution of this problem.

According to the invention there is provided a distance measuring system for measuring the distance along which a wave travels between transmitting and receiving means or the corresponding phase shift, said system comprising: fixed frequency oscillator means having an output coupled to said transmitting means; variable frequency oscillator means having a frequency control input and an output; first mixing means having two inputs respectively coupled to said oscillator means outputs; delaying means coupled to said variable frequency oscillator means output; second mixing means having two inputs respectively coupled to said first mixing means and to said delaying means; a phase comparator having two inputs respectively coupled to said receiving means and said second mixing means; said comparator having an output coupled to said frequency control input to make said variable frequency proportional to said distance.

For a better understanding of the invention and to show how the same may be carried into effect, reference will be made to the drawing accompanying the ensuing description and in which.

Figure 1:
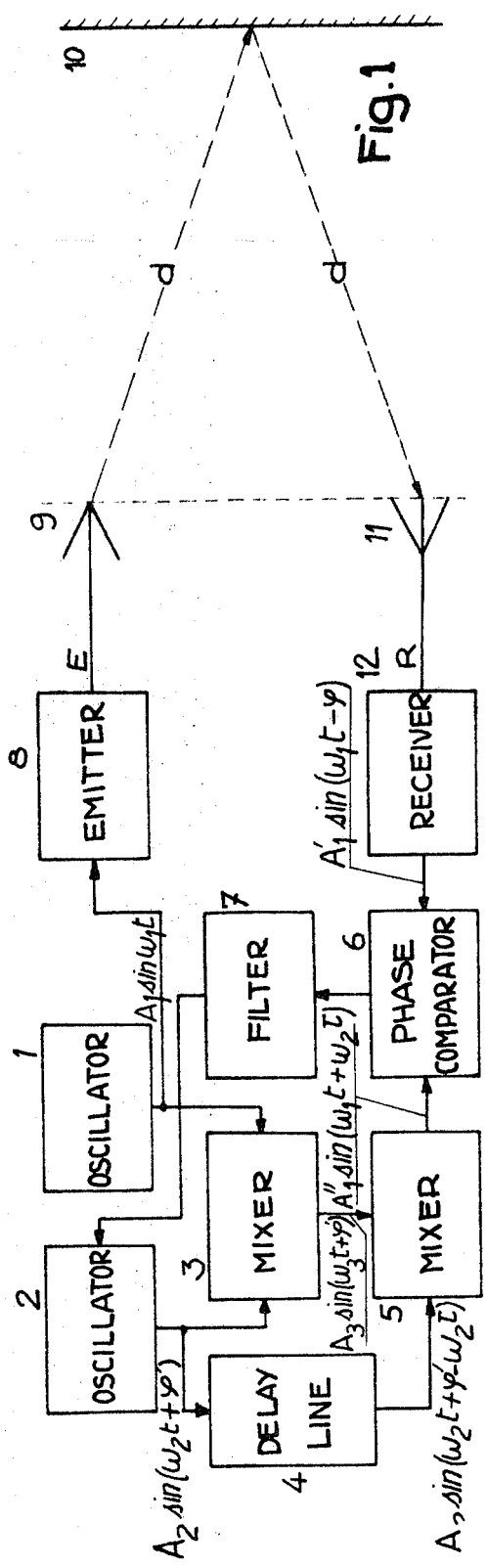
FIG. 1 illustrates a first embodiment of the system according to the invention.

The distance measuring system shown in FIG. 1 comprises an oscillator 1, operating at a fixed frequency $\omega_1/2$ and producing a signal $A_1 \sin \omega_1 t$, and an oscillator 2, operating at a variable frequency $\omega_2/2\pi$ and supplying a signal $A_2 \sin(\omega_2 t + \psi')$. The angle $\psi'$ has an arbitrary value, while depending, as the frequency $\omega_2/2\pi$, on the control voltage applied to the oscillator 2 by a phase comparator 6, through a filter 7. The signals produced by the oscillators 1 and 2 are added in a mixer 3 which produces a signal $A_3 \sin(\omega_3 t + \Phi')$, whose frequency $\omega_3/2\pi$, is for example, the sum of the frequencies $\omega_1/2$ and $\omega_2/2\pi$. The signal $A_3 \sin(\omega_3 t + \Phi')$ is in turn mixed, with the signal $A_2 \sin(\omega_2 t + \Phi' - _2\tau)$ which appears at the output of a delay line 4 whose input is coupled to the oscillator 2. This latter mixing is a subtractive mixing, and is carried out by a mixer 5, which produces a signal $A''_1 \sin(\omega_1 t + \omega_2 \tau)$, $\tau$ being the delay introduced by the line 4.

As also shown in FIG. 1, the signal $A_1 \sin \omega_1 t$ from the oscillator 1 is fed to a transmitter 8 and a directional transducer 9, which radiates a wave towards the target 10. Upon reflection on the latter, the wave is received by the receiving transducer 11, after having undergone a phase shift corresponding to the out and back propagation distance $2d$. The receiving transducer 11 feeds the phase comparator 6 through a receiver 12.

The comparator 6 is thus supplied with the signal $A'_1 \sin(\omega_1 t - \Phi)$. The phase comparator 6 controls the frequency $\omega_2/2\pi$ of the oscillator 2 in such a manner as to make the phase value $\omega_2 \tau$ of the signal from the mixer 5 equal to the phase value $\Phi$ of the signal from the receiver 12.

The relationship $|\omega_2\tau| = |\psi|$ can be written:

$$2\pi f_2 \tau = \frac{4\pi f_1 d}{C}$$

where:

$$f_1 = \frac{\omega_1}{2\pi}$$

and C is the speed of propagation of the electromagnetic wave. Since $f_1$ and $\tau$ are determined by design, it will be seen that the distance $d$ is given by the expression:

$$d = K \cdot f_2,$$

where $$K = \frac{C \cdot \tau}{2f_1}.$$

By way of a nonlimitative example, one can choose a range of variation of $f_2$, between 0.5 and 10 Mc/s, a frequency $f_1 = 10$ Mc/s. and a delay $\tau = 0.1 \mu S$. With $C = 10^6$ m/s., one obtains $K = 15.10^1$ m/sec. One can thus measure distances between $d_{min} = 0.75$ $m$ and $d_{max} = 15$ $m$, without any ambiguity.

Assuming that the speed of propagation is known with very high accuracy, a phase error of 1° in the phase locking, introduces an error of around 4 cm. in the distance $d$ measuring.

In the system illustrated in FIG. 1, a wave of frequency $f_1$ is directly radiated, but it goes without saying that the signal $A_1 \sin \omega_1 t$ may be used to carry out amplitude modulation of a carrier wave having a much higher frequency, thus making it feasible to use a highly directional aerial.

Figure 2:
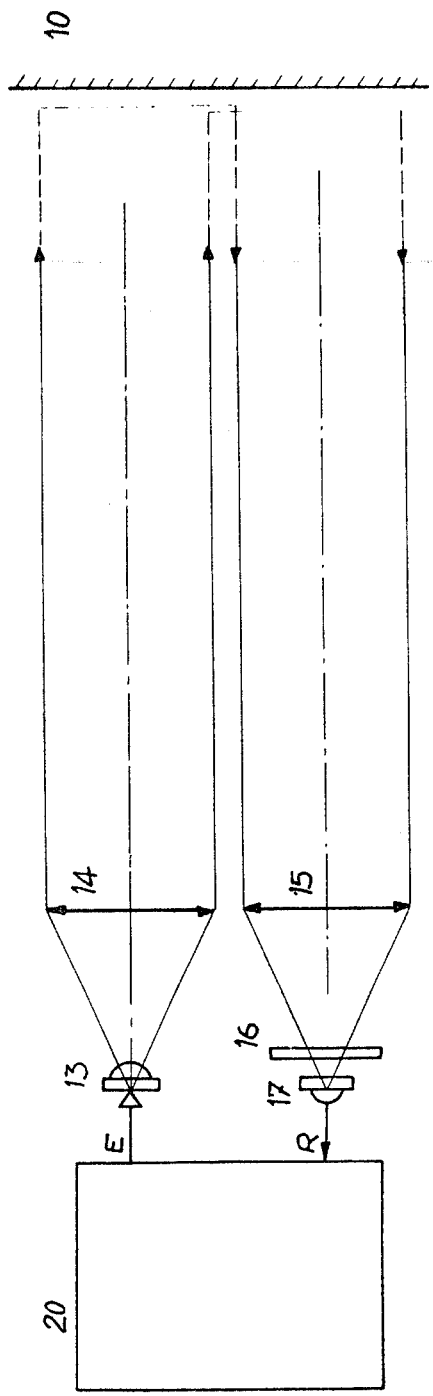
FIG. 2 illustrates a modification of the system of FIG. 1.

In FIG. 2 a system 20 of the kind shown in FIG. 1, has been illustrated, in which the channel E modulates a semiconductor light generator 13, while the channel R is coupled to a photoelectric element 17. The generator 13 is located at the focus of a collimator device 14 aimed at the target 10. A further collimator device 15 concentrates the energy reflected from the target 10 on the photoelectric element 17. An optical filter is inserted before the photoelectric element 17 to ensure that only the radiation from the generator 13 is actinic.

The distance measuring systems illustrated in FIGS. 1 and 2 have a relatively poor degree of accuracy in the range of distances in which the phase shift experienced by the wave does not exceed $2\pi$. It is necessary for the phase shift in the wave to exceed substantially $2\pi$ in order to achieve relatively high accuracy, since in this way the distance measured in made up of a whole number of half-wavelengths and of a fraction of a wavelength.

Figure 3:
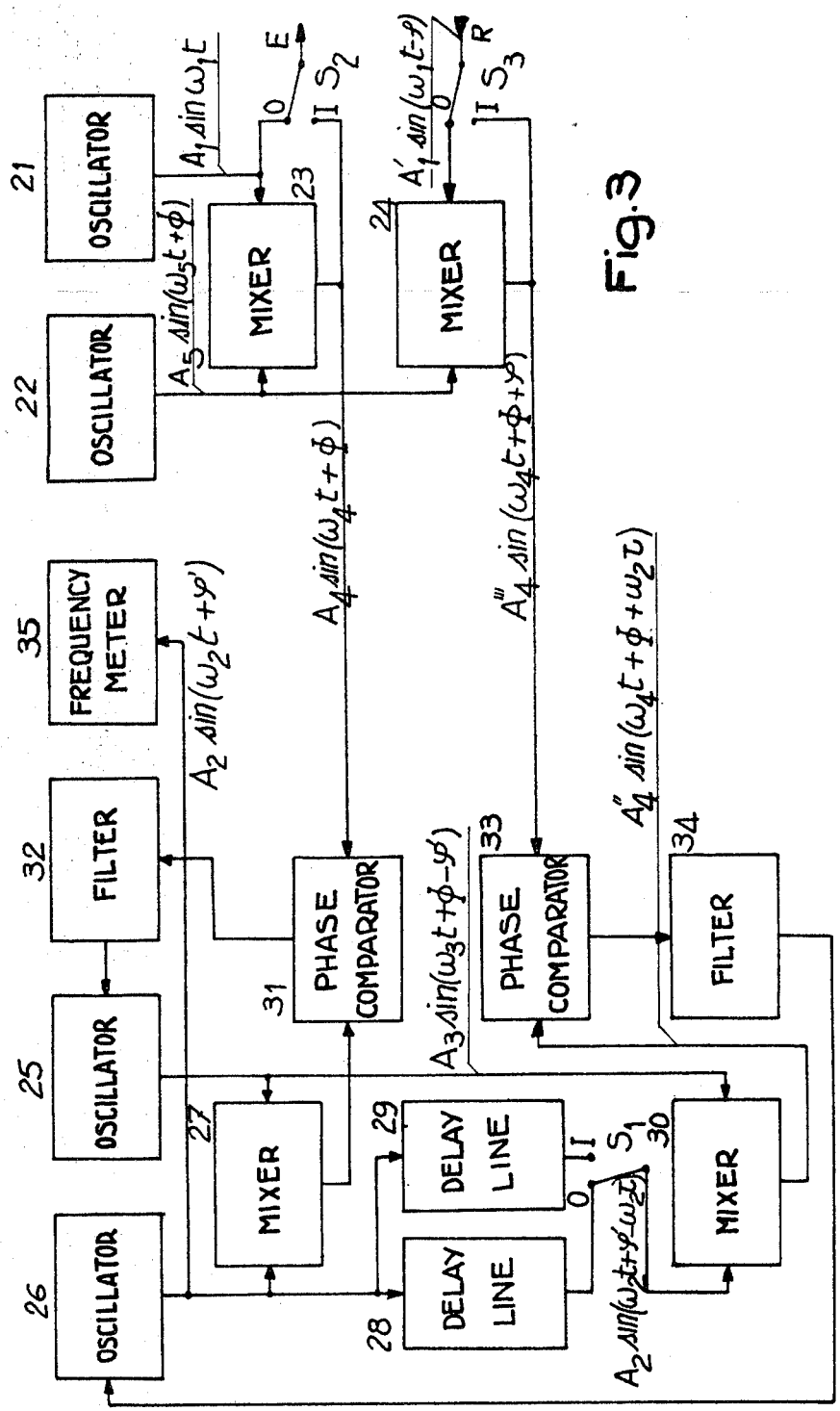
FIG. 3 illustrates a further embodiment of the system according to the invention.

FIG. 3, shows the diagram of a further distance measuring system according to the invention, the mode of operation of which is similar to that of FIG. 1 but which enables the range and accuracy of the measurements to be considerably increased.

This system comprises two oscillators 21 and 22 respectively supplying the signals $A_1 \sin \omega_1 t$ and $A_5 \sin(\omega_5 t + \Phi)$; the frequencies $\omega_1/2\pi$ and $\omega_5/2\pi$ differ from one another by a small amount in order that the difference between them, produced in a mixer 23, gives rise to a signal $A_4 \sin(\omega_4 t + \Phi)$ such that $\omega_4$ is much smaller than $\omega_1$; is an arbitrary phase angle. The angular frequency $\omega_4$ must also satisfy the condition that the corresponding wavelength is longer than twice the range of the system. A switch $S_2$ enables the signal $A_1 \sin \omega_1 t$ or the signal $A_4 \sin(\omega_4 t + \Phi)$ to be applied to the transmission channel E. A second switch $S_3$ operates in synchronism with the switch $S_2$ and receives the signals from the receiving channel R, directing them to a mixer 24 or to a phase comparator 33. In one phase of operation, the moving contacts of switches $S_2$ and $S_3$ occupy the positions shown in FIG. 3, in which the signal $A_1 \sin\omega_1 t$ is transmitted and the signal $A'_1 \sin(\omega_1 t - \Phi)$ received, where $\Phi$ is the phase shift experienced by the wave reflected from the target. In the other phase of operation, complementary to the above mentioned, the signal $A_4 \sin(\omega_4 t + )$ is transmitted and the signal $A'''_4 \sin(\omega_4 t + +\Phi)$ is received. Whatever the states of the switches $S_2$ and $S_3$, at the inputs of the comparators 31 and 33 receive the signals $A_4 \sin(\omega_4 t \Phi)$ and $A'''_4 \sin(\omega_4 t + +\Phi)$. The system also comprises two variable frequency oscillators 25 and 26, respectively supplying the signals $A_3 \sin(\omega_3 t + +\Phi')$ and $A_2 \sin(\omega_2 t + \Phi')$, where $\Phi'$ is an arbitrary phase angle the amplitude of which is the same in both signals since the two oscillators 25 and 26 are phase locked to one another through a feedback loop.

A mixer 27 energized by the oscillators 25 and 26 produces the difference between its two input signals and supplies a corresponding signal to a phase comparator 31 which, by means of a filter 32, controls the frequency of the oscillator 25 so that the condition $\omega_3 - \omega_2 = \omega A4$ is satisfied. A mixer 30 produces the difference between the signal $A_3 \sin(\omega_3 t + -\Phi')$ from the oscillator 25 and the delayed signal $A_2 \sin(\omega_2 t + \Phi' -_2 \tau)$ coming from one of the delay lines 28 and 29, connected to the output of the oscillator 26, the delay $\tau$ depending upon the selection of the delay line in accordance with the operation of a switch $S_1$ mechanically ganged to switches $S_2$ and $S_3$. The signal $A''_3 \sin(\omega_4 t + +\omega_2 \tau)$, supplied by the mixer 30 is applied to a phase comparator 33 which controls the frequency of the oscillator 26 by means of the filter 34. The frequency of the oscillator 26 is measured by a counter-type frequency meter 35.

The system illustrated in FIG. 3 is based upon the same principle as the system of FIG. 1; it produces a signal whose frequency $$f_2 = \frac{\omega_2}{2}$$

is proportional to the distance being measured. The frequency setting of the oscillator 26 is carried out in two steps. During the first step of operation, the switches $S_1$, $S_2$ and $S_3$ are in state I; the frequency of the transmitted signal is $\omega_4/2\pi$ and the phase shift due to the out and back propagation of the signal is $$\varphi_1 = \frac{2d\omega_4}{C}$$

This phase shift 4, is equal to the phase shift $\omega_2 \tau_1$ introduced by the delay line 29, so that the frequency of the oscillator 26 is set to the value:

$$f_2 = \frac{\omega_2}{2\pi} = \frac{d\omega_4}{\pi C \tau_1}$$

During the second step of operation, the switches $S_1$, $S_2$ and $S_3$ are in the state 0; the signal having the frequency $\omega_1/2$ is transmitted and received, giving rise to a phase shift $$\psi_2 = \frac{2d\omega_1}{C}$$

This phase shift $\Phi_2$ must be equal to the phase shift $\omega_2 \tau_2$ introduced by the delay line 28, so that the frequency of the oscillator 26 has the value:

$$f_2 = \frac{\omega_2}{2\pi} = \frac{d\omega_1}{\pi C \tau_2}$$

The values of the frequency $f_2$ at which the oscillator 26 is set are the same provided that $$\frac{\omega_4}{\tau_1} = \frac{\omega_1}{\tau_2}$$

By way of a nonlimitative example, the following magnitudes may be used:

$\frac{\omega_1}{2\pi} = 10.000$ kc./s.; $\frac{\omega_5}{2\pi} = 10.1000$ kc./s.; $\frac{\omega_4}{2\pi} = 100$ kc./s.

$\tau_1 = 0.1 \mu S$; $\tau_2 = 10 \mu S$; $d = 900$; $m = 3 \times 10^8$ m/s.

During the first phase of operation, the frequency $f_2$ is coarsely set to $$f_2 = \frac{900 \times 10^5 \times 2}{\pi \times 3.10^8 \times 10^{-7}} = 6.000 \text{ kc./s.}$$

During the second phase, the frequency $f_2$ is accurately set to the same value but this time the setting accuracy is 100 times higher since the wavelength used is 100 times shorter than in the first phase.

For the same accuracy, the system of FIG. 3 is able to measure, without any ambiguity, a distance which is 100 times greater than that which may be measured by the system of FIG. 1.

The distance measuring systems illustrated in FIGS. 1 to 3 can be used in any isotropic media of propagation for which the speed of propagation is known.

The waves used can be radio waves, acoustic waves or light waves and may be modulated or unmodulated. In addition, the controlled frequency signal issuing from the phase-controlled oscillator may have a variety of applications:

It may be transmitted over a distance; it may be recorded; it may be fed into a frequency discriminator associated with an indicating instrument; it can be also be applied to a counter-type frequency meter calibrated in units of distance. Without departing from the scope of the invention, the device described may also be employed for phase evaluation when not being used for distance measurement purposes.

Of course the invention is not limited to the embodiments described and shown which were given solely by way of example.

I claim:

1. A system adapted for measuring the transmission phase shift corresponding to the distance along which a wave travels between transmitting and receiving means, said system comprising: fixed frequency oscillator means having an output coupled to said transmitting means; variable frequency oscillator means having a frequency control input and an output; first mixing means having two inputs respectively coupled to said oscillator means outputs; delaying means coupled to said variable frequency oscillator means output; second mixing means having two inputs respectively coupled to said first mixing means and to said delaying means; a phase comparator having two inputs respectively coupled to said receiving means and said second mixing means; said comparator having an output coupled to said frequency control input to make said variable frequency proportional to said distance.

2. A measuring system as claimed in claim 1, wherein said wave is a luminous modulated wave undergoing a reflection on a target; said transmitting means comprising a modulated electro-optical source and an optical collimator device at the focus of which said source is positioned; said receiving means comprising a photoelectric detector a further optical collimator device at the focus of which said detector is positioned; and an optical filter for filtering the energy radiated by said source associated with said last mentioned collimator.

3. A measuring system as claimed in claim 1, wherein said fixed frequency oscillator means comprises a first oscillator; said variable frequency oscillator means comprising a second oscillator; said first mixing means comprising a first mixer having two inputs respectively coupled to the outputs of said first and second oscillators; said delaying means comprises a delay line connected to said second oscillator output; said second mixing means comprises a second mixer having two inputs respectively connected to the outputs of said delay line and said first mixer; said comparator is coupled to said frequency control input through a low-pass filter; and frequency measuring means are coupled to said second oscillator output for supplying an indication of said distance.

4. A measuring system as claimed in claim 1, wherein said fixed frequency oscillator means comprise a first oscillator, a second oscillator, a first mixer coupled to said first and second oscillators and first switching means for alternately coupling said transmitting means to the outputs of said first oscillator and said first mixer; said variable frequency oscillator means comprises a third oscillator; said first mixing means comprises a fourth oscillator having a frequency control input, a second mixer coupled to the outputs of said third and fourth oscillators, a second phase comparator having two inputs respectively coupled to the outputs of said first and second mixers; said second comparator is coupled to the control input of said fourth oscillator; said delaying means comprises first and second delay lines having inputs respectively coupled to the output of said third oscillator; said second mixing means comprises a third mixer having a first input coupled to the outputs of said fourth oscillator and a second input alternately coupled to the outputs of said delay lines through second switching means operating at synchronism with said first switching means; a fourth mixer has an input and an output respectively coupled to the outputs of said second oscillator and said third mixer, and another input coupled alternately with said output, to said receiving means through third switching means operated in synchronism with said first switching means.